United States Patent
Yasui et al.

(10) Patent No.: US 6,820,603 B2
(45) Date of Patent: Nov. 23, 2004

(54) CONTROL SYSTEM AND CONTROL METHOD FOR INTERNAL COMBUSTION ENGINE, AND ENGINE CONTROL UNIT

(75) Inventors: Yuji Yasui, Saitama-ken (JP); Jun Iwamoto, Saitama-ken (JP); Hitoshi Takahashi, Saitama-ken (JP); Hidemi Ogihara, Saitama-ken (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 10/771,323

(22) Filed: Feb. 5, 2004

(65) Prior Publication Data

US 2004/0154590 A1 Aug. 12, 2004

(30) Foreign Application Priority Data

Feb. 12, 2003 (JP) ......................................... 2003/033806

(51) Int. Cl.[7] ............................................. F02D 41/00
(52) U.S. Cl. ....................... 123/672; 123/681; 123/699; 123/399
(58) Field of Search ................................ 123/672, 681, 123/683, 698, 699, 399, 361, 679, 567, 585, 586

(56) References Cited

U.S. PATENT DOCUMENTS 6,155,230 A * 12/2000 Iwano et al. ............ 123/339.16
6,594,987 B2 * 7/2003 Uranishi ....................... 60/277
6,595,171 B2 * 7/2003 Yoshiki et al. ............ 123/90.15
6,701,244 B2 * 3/2004 Oota et al. ................... 701/104

* cited by examiner

Primary Examiner—John T. Kwon
(74) Attorney, Agent, or Firm—Arent Fox, PLLC.

(57) ABSTRACT

There is provided a control system for an internal combustion engine, which is capable of meeting a driver's demand of torque, and achieving high combustion efficiency and high emission-reducing performance by a three-way catalyst in lean-burn operation in a compatible manner. The control system sets a control amount indicative of either an oxygen mass supplied to a combustion chamber or a fuel injection amount such that oxygen concentration in exhaust gases becomes equal to a value corresponding to stoichiometric combustion. A target value corresponding to a demanded torque is set based on detected engine operating conditions. A degree of opening of a main throttle valve and a degree of opening of a sub-throttle valve in a passage by passing an intake passage equipped with a nitrogen-enriching device are controlled such that the control amount becomes equal to the set target value.

24 Claims, 8 Drawing Sheets

FIG. 3

$$Gcyl(k) = Gth(k) - \frac{\Delta PB(k) \cdot Vb}{R \cdot Tb} \quad \cdots\cdots (1)$$

Vb : INTAKE-MANIFOLD VOLUME
R : GAS CONSTANT
Tb : INTAKE AIR TEMPERATURE $$Go2(k) = Kgo2 \cdot Gfuel(k) \quad \cdots\cdots (2)$$

Kgo2 : Gfuel → Go2 CONVERSION COEFFICIENT $$THmain(k) = -Krch \cdot \sigma(k) + Kadp \cdot \sum_{i=0}^{k} \sigma(i) \quad \cdots\cdots (3)$$

$$\sigma(k) = [Go2(k) - Go2\_cmd(k)] + S[Go2(k-1) - Go2\_cmd(k-1)] \quad \cdots\cdots (4)$$

σ : SWITCHING FUNCTION
Krch, Kadp : FEEDBACK GAIN
S : RESPONSE SPECIFYING PARAMETER $$THsub(k) = -Krch' \cdot \sigma'(k) + Kadp' \cdot \sum_{i=0}^{k} \sigma'(i) \quad \cdots\cdots (5)$$

$$\sigma'(k) = [Go2(k) - Go2\_cmd(k)] + S'[Go2(k-1) - Go2\_cmd(k-1)] \quad \cdots\cdots (6)$$

σ' : SWITCHING FUNCTION
Krch', Kadp' : FEEDBACK GAIN
S' : RESPONSE SPECIFYING PARAMETER

| | | | |
|---|---|---|---|
| (a) NATURAL AIR | N₂ 79% | | O₂ 21% |
| (b) OPTIMAL NITROGEN -ENRICHED AIR (OPTIMAL CONCENTRATION) | N₂ 85.3% | | O₂ 14.7% |
| (c) FUEL INJECTION AMOUNT | | | |

SUPERFLUOUS OXYGEN

CONTROL SYSTEM AND CONTROL METHOD FOR INTERNAL COMBUSTION ENGINE, AND ENGINE CONTROL UNIT

BACKGROUND OF THE INVENTION

1. Field of the Invention

The present invention relates to a control system and control method for an internal combustion engine equipped with a nitrogen-enriching device in an intake passage for enriching nitrogen in intake air, and an engine control unit.

2. Description of the Related Art

Conventionally, a control system for an internal combustion engine, of the above-mentioned kind, has been disclosed e.g. in Japanese Laid-Open Patent Publication (Kokai) No. H08-254161 (FIG. 1). This control system is applied e.g. to diesel engines, and includes a gas separation device disposed in a branch passage branching from an intake passage. This gas separation device separates incoming intake air (outside air) into nitrogen and oxygen-enriched air by a separation membrane provided in its housing. At an upstream portion of the intake passage, there is disposed a compressor of a turbocharger that supercharges the intake air so as to cause the intake air to pass through the separation membrane. The gas separation device has a nitrogen outlet connected to an intake port via the branch passage, and an oxygen-enriched air outlet connected to cylinders via an oxygen supply passage having an oxygen storage tank interposed therein. A cylinder head of each cylinder has a gas injection valve for injecting oxygen-enriched air into the cylinder. At a location downstream of a branching point where the branch passage branches from the intake passage, there is disposed a butterfly valve. Further, an exhaust gas recirculation (EGR) passage is connected to the branch passage at a location downstream of the gas separation device. In the exhaust gas recirculation passage, there is provided an EGR valve for controlling the amount of EGR gas.

In the control system described above, in a low-load operating region of the engine, for example, the degree of opening of the butterfly valve is controlled such that part of the intake air flows into the branch passage, and the EGR valve is opened, while stopping the operation of the gas injection valves. As a result, nitrogen separated by the gas separation device in the branch passage is supplied to the cylinders, together with outside air through the intake passage, so that the oxygen content of the intake air supplied to the cylinders is reduced as a whole, which provides practical EGR effects. Further, the intake air is depressurized due to pressure loss caused during passing of the intake air through the gas separation device, which promotes recirculation of the EGR gas, so that it is possible to provide proper EGR effects, thereby suppressing generation of NOx.

It is also conventionally known that in a low-load operating condition of a gasoline engine, for example, lean-burn operation is carried out in which the air-fuel ratio of an air-fuel mixture is controlled to be an extremely larger value than the stoichiometric air-fuel ratio in order to improve fuel economy (as disclosed e.g. in the publication of Japanese Patent No. 2817106). The effect of improving fuel economy by this lean-burn operation is achieved through reduction of heat loss by an increase of the working fluid and the improvement of combustion efficiency by reduction of pumping loss, and as shown in FIG. 9, when the air-fuel ratio is approximately 21.0, the brake specific fuel consumption BSFC is minimized, whereby the best fuel economy can be achieved.

However, in the lean-burn operation described above, although fuel economy is improved, NOx in exhaust gases cannot be reduced sufficiently by a three-way catalyst generally used as an emission reduction device. This is because in lean-burn operation, the air-fuel ratio of an air-fuel mixture is higher than the stoichiometric air-fuel ratio, so that a large amount of superfluous oxygen remains unburnt in the exhaust gases, whereas the three-way catalyst exhibits its highest performance for reducing CO, HC and NOx, under a condition where oxygen density is substantially zero.

To solve this problem, conventionally, as a substitute for the three-way catalyst, there have been proposed the following emission reduction devices: (1) a catalyst of a type that stores NOx during lean-burn operation and reduces NOx during stoichiometric combustion executed at the stoichiometric air-fuel ratio; (2) a catalyst of a type capable of reducing NOx even when superfluous oxygen exists. However, these catalysts are both more expensive than the three-way catalyst. Further, in the case of the first type, when storage of NOx reaches saturation, lean-burn operation has to be interrupted so as to prevent NOx from being emitted, and hence the effect of improving fuel economy by lean-burn operation cannot be fully obtained. On the other hand, the second type is not capable of achieving excellent emission control since its NOx reduction rate is low when superfluous oxygen exists, which prevents this type from becoming commercially practical.

Since the problem of NOx reduction in lean-burn operation results from the existence of superfluous oxygen as described above, it is effective to make use of the gas separation device disclosed in Japanese Laid-Open Patent Publication (Kokai) No. 8-254161 (FIG. 1 of the publication), to supply nitrogen from the gas separation device to the engine during lean-burn operation. In this control system, however, since the butterfly valve is opened only to allow part of intake air to flow into the gas separation device, for supply of nitrogen, the amount of intake air that actually flows into the gas separation device cannot be gasped accurately. Further, a gas separation device of this kind has the characteristic that its separation performance varies with the boost pressure and the temperature of intake air, which makes the degree of separation between nitrogen and oxygen-enriched air unknown, and the separation performance is degraded due to insufficiency of boost pressure e.g. at the start of the turbocharger. Consequently, the above control system cannot accurately control the actual amount of nitrogen in intake air supplied to the cylinders of the engine, i.e. the actual amount or concentration of oxygen, and therefor superfluous oxygen inevitably remains in exhaust gases. As a result, the emission-reducing potential of the three-way catalyst cannot be fully exploited, which also makes it impossible to achieve excellent exhaust emission control.

Further, in this control system, in low-load operation, EGR is carried out simultaneously with supply of nitrogen. For this reason, $CO_2$ with a high specific heat is increased by combustion, causing increased heat loss. As a result, combustion efficiency is reduced, which makes it impossible to sufficiently obtain the effect of improving fuel economy by lean-burn operation. Moreover, CO in the EGR gas can cause carbon clogging and generation of smoke.

SUMMARY OF THE INVENTION

It is an object of the present invention to provide a control system and control method for an internal combustion engine and an engine control unit which are capable of meeting a driver's demand of torque, and achieving high combustion efficiency and high emission reducing performance by a three-way catalyst in lean-burn operation in a compatible manner.

To attain the above object, in a first aspect of the present invention, there is provided a control system for an internal combustion engine including a throttle valve and a nitrogen-enriching device that enriches nitrogen in intake air, both disposed in an intake passage, and an emission reduction device disposed in an exhaust passage, for reducing exhaust emissions, the control system comprising:

an oxygen concentration sensor provided in the exhaust passage, for detecting oxygen concentration in exhaust gases;

control amount-setting means for setting a control amount indicative of one of a mass of oxygen supplied to a combustion chamber of the engine and a fuel injection amount, such that the detected oxygen concentration becomes equal to an oxygen concentration corresponding to stoichiometric combustion;

operating condition-detecting means for detecting operating conditions of the engine;

target value-setting means for setting a target value of the control amount, which corresponds to a torque demanded of the engine, based on the detected operating conditions of the engine; and throttle valve opening control means for controlling a degree of opening of the throttle valve such that the control amount becomes equal to the set target value.

In the internal combustion engine, intake air (outside air) having flowed into the intake passage has nitrogen therein enriched (or oxygen therein reduced) by the nitrogen-enriching device, and then the intake air is supplied to the combustion chamber. The amount of intake air is controlled by the throttle valve. Further, with the arrangement of this control system, the control amount indicative of one of the mass of oxygen supplied to a combustion chamber of the engine and the fuel injection amount is set such that the oxygen concentration in the intake air detected by the oxygen concentration sensor becomes equal to an oxygen concentration corresponding to stoichiometric combustion (i.e. combustion in which fuel is burned in a state containing a just enough amount of oxygen, without producing substantially any superfluous oxygen). This configuration makes it possible to control the ratio between the mass of oxygen actually supplied to the combustion chamber and the fuel injection amount, such that stoichiometric combustion without substantially any superfluous oxygen takes place. Further, since the degree of opening of the throttle valve is controlled such that the control amount becomes equal to a target value corresponding to a demanded torque, it is possible to meet a driver's demand of torque.

As described above, intake air containing enriched nitrogen is supplied to the combustion chamber, and at the same time the amount of intake air and the fuel injection amount are controlled as above, whereby in an operating condition where torque demand is low, it is possible to perform lean-burn operation in which the air-fuel ratio is controlled to a far larger value than the stoichiometric air-fuel ratio, in the state of stoichiometric combustion. As a result, even in lean-burn operation, for example, exhaust gases can be held in the stoichiometric state containing hardly any superfluous oxygen, and therefore, even when a three-way catalyst is used as an emission reduction device, it is possible to fully exploit the emission-reducing potential thereof, thereby achieving excellent emission control.

Nitrogen-enriched air is generated using the nitrogen-enriching device by replacing a portion of an oxygen component in outside air (hereinafter referred to as "natural air" for distinction from nitrogen-enriched air) with a nitrogen component. Further, since oxygen and nitrogen are 2-atom molecules, they are equal in specific heat, and hence they are also equal in heat loss in combustion. Therefore, even when nitrogen-enriched air is used in lean-burn operation, it is possible to maintain as high combustion efficiency and excellent fuel economy as in lean-burn operation using natural air. Thus, the present invention makes it possible to achieve high combustion efficiency and high emission reducing performance by a three-way catalyst in lean-burn operation in a compatible manner while meeting a driver's demand of torque. Further, differently from the case of using EGR, there is no possibility of causing carbon clogging or smoke since nitrogen-enriched air contains no impurity of CO.

Preferably, a rate of nitrogen enrichment by the nitrogen-enriching device is set such that the oxygen concentration in the intake air to be supplied to the combustion chamber becomes equal to a predetermined oxygen concentration.

The composition of natural air is: N:CO=79% : 21% (see FIG. 10($a$)), and in a case where natural air is used, stoichiometric combustion takes place when the air-fuel ratio is a stoichiometric air-fuel ratio (air:fuel=14.7:1.0). On the other hand, when lean-burn operation is performed using natural air as described hereinbefore, due to improved combustion efficiency, best fuel economy is achieved at an air-fuel ratio of around 21.0 (hereinafter referred to as "the best-fuel economy air-fuel ratio")(see FIG. 9), but since oxygen is excessive with respect to fuel, superfluous oxygen occurs (see FIG. 10($c$)). Further, with the arrangement of the present invention, through the control of the mass of oxygen and the fuel injection amount, the state of stoichiometric combustion is maintained even in lean-burn operation, as described hereinbefore. From the above relationship, it is considered that an oxygen concentration X in intake air for achieving best fuel economy while maintaining the state of stoichiometric combustion in lean-burn operation is: X=21%×14.7/21.0=14.7% (see FIG. 10($b$)). Therefore, according to this preferred embodiment, by setting the rate of nitrogen enrichment of the nitrogen-enriching device such that the oxygen concentration in intake air becomes equal to the predetermined concentration (=14.7%, hereinafter referred to as "the optimal concentration"), it is possible to maintain high emission-reducing performance by the three-way catalyst in lean-burn operation, and at the same time by controlling the air-fuel ratio to the best-fuel economy air-fuel ratio, it is possible to achieve the most excellent combustion efficiency and the best fuel economy.

Preferably, the throttle valve comprises a main throttle valve provided in the intake passage at a location downstream of the nitrogen-enriching device and a sub-throttle valve provided in a bypass passage bypassing the nitrogen-enriching device and joining the intake passage at a location upstream of the main throttle valve, and the throttle valve opening control means controls a degree of opening of the main throttle valve and a degree of opening of the sub-throttle valve.

With the arrangement of this preferred embodiment, by controlling the degree of opening of the main throttle valve, it is possible to control the amount of intake air to be supplied to the combustion chamber of the engine. Further, by controlling the degree of opening of the sub-throttle valve, it is possible to change the ratio between the amount of nitrogen-enriched air from the nitrogen-enriching device and the amount of natural air from the bypass passage. This makes it possible to control the oxygen concentration in intake air to be supplied to the combustion chamber, as desired. Therefore, by controlling the degree of opening of the main throttle valve and the degree of opening of the sub-throttle valve such that the control amount becomes equal to a target value corresponding to a demanded torque, it is possible to obtain the optimal amount of intake air and optimal oxygen concentration corresponding to the demanded torque of the engine at the time. For example, in lean-burn operation with a small demanded torque, by controlling the degree of opening of each of the two throttle valves such that the amount of intake air increases and at the same time the oxygen concentration decreases, it is possible to achieve stoichiometric combustion, whereas in a high output operating condition, by controlling the degree of opening of each of the two throttle valves such that both the amount of intake air and the oxygen concentration increase, it is possible to meet a high torque demand.

More preferably, the control system further comprises intake air amount-detecting means for detecting an amount of intake air supplied to the combustion chamber, and intake air amount-determining means for determining whether or not the detected amount of intake air has reached a predetermined upper limit intake air amount, and when the detected amount of the intake air has not reached the predetermined upper limit intake air amount, the throttle valve opening control means holds the degree of opening of the sub-throttle valve at a predetermined appropriate degree of opening and controls the degree of opening of the main throttle valve.

With the arrangement of this preferred embodiment, the degree of opening of the sub-throttle valve is held at the predetermined appropriate degree of opening until the amount of intake air reaches the predetermined upper limit intake air amount, and at the same time the degree of opening of the main throttle valve is controlled such that the control amount becomes equal to the target value. As a result, the amount of intake air is increased or decreased according to a demanded torque, with the oxygen concentration in the intake air being held substantially constant, whereby a mass of oxygen commensurate with the demanded torque is supplied to the combustion chamber. Further, it is possible to carry out lean-burn operation until the amount of intake air reaches the predetermined upper limit intake air amount, i.e. to the limit within which the demanded torque can be met. This makes it possible to further improve fuel economy.

Further preferably, the predetermined appropriate degree of opening of the sub-throttle valve is set such that the concentration of oxygen in the intake air to be supplied to the combustion chamber becomes equal to a predetermined concentration.

With the arrangement of this preferred embodiment, since the predetermined appropriate degree of opening of the sub-throttle valve is set as above, before the amount of intake air reaches the predetermined upper limit intake air amount, the degree of opening of the sub-throttle valve is held at the predetermined appropriate degree of opening, whereby the concentration of oxygen in the intake air to be supplied to the combustion chamber is controlled such that it is substantially equal to the predetermined concentration. Therefore, by setting the aforementioned optimal concentration to this predetermined concentration, it is possible to achieve the most excellent combustion efficiency and the best fuel economy in lean-burn operation.

Further preferably, after the detected amount of intake air has reached the predetermined upper limit intake air amount, the throttle valve opening control means holds the degree of opening of the main throttle valve at a predetermined effective degree of opening and controls the degree of opening of the sub-throttle valve.

With the arrangement of this preferred embodiment, after the amount of intake air has reached the predetermined upper limit intake air amount, the degree of opening of the main throttle valve is held at the predetermined effective degree of opening, and the degree of opening of the sub-throttle valve is controlled such that the control amount becomes equal to the target value. As a result, the oxygen concentration in intake air is increased and decreased while holding the amount of intake air substantially constant, whereby a mass of oxygen commensurate with a demanded torque is supplied to the combustion chamber. Therefore, even in high output operation, it is possible to meet a high torque demand, and maintain high emission-reducing performance by the three-way catalyst since the state of stoichiometric combustion is maintained. Further, in this case, by setting the flow rate of intake air such that when the sub-throttle valve is fully open, the major portion of the intake air flows into the bypass passage, and the effect of nitrogen enrichment by the nitrogen-enriching device can hardly be obtained, it is possible to achieve substantially as high a torque as is obtained when natural air is used.

Even more preferably, the predetermined effective degree of opening of the main throttle valve is set to such a degree of opening that even if the degree of opening of the main throttle valve is further increased from the predetermined effective degree of opening, the amount of intake air does not increase any further.

With the arrangement of this preferred embodiment, since the predetermined effective degree of opening of the main throttle valve is set as above, after the amount of intake air has reached the predetermined upper limit intake air amount, by holding the degree of opening of the main throttle valve at the predetermined effective degree of opening, it is possible to secure the maximum intake air amount, and hence it is also possible to sufficiently meet a high torque demand.

Preferably, the control system further comprises a supercharger provided in the intake passage at a location upstream of the nitrogen-enriching device, for supercharging the intake air.

In general, the nitrogen-enriching device has a membrane provided therein, and performs enrichment of nitrogen by passing air through the membrane. With the arrangement of this preferred embodiment, differential pressure for causing air to pass through the membrane can be secured by supercharging of intake air by the supercharger, whereby it is possible to obtain a sufficient nitrogen enrichment rate. When the supercharger is implemented by a compressor of a turbocharger, boost pressure is insufficient e.g. at the start-up of the engine, so that the nitrogen enrichment rate tends to become insufficient. However, according to this preferred embodiment, exhaust gases can be held in the state of stoichiometric combustion irrespective of the nitrogen enrichment rate, as described hereinbefore, so that it is possible to obtain the above described advantageous effects without difficulty.

To attain the above object, in a second aspect of the present invention, there is provided a method of controlling an internal combustion engine including a throttle valve and a nitrogen-enriching device that enriches nitrogen in intake air, both disposed in an intake passage, and an emission reduction device disposed in an exhaust passage, for reducing exhaust emissions, the method comprising the steps of:

detecting oxygen concentration in exhaust gases;

setting a control amount indicative of one of a mass of oxygen supplied to a combustion chamber of the engine and a fuel injection amount, such that the detected oxygen concentration becomes equal to an oxygen concentration corresponding to stoichiometric combustion;

detecting operating conditions of the engine;

setting a target value of the control amount, which corresponds to a torque demanded of the engine, based on the detected operating conditions of the engine; and controlling a degree of opening of the throttle valve such that the control amount becomes equal to the set target value.

With the arrangement of the second aspect of the present invention, it is possible to obtain the same advantageous effects as provided by the first aspect of the present invention.

Preferably, the throttle valve comprises a main throttle valve provided in the intake passage at a location downstream of the nitrogen-enriching device and a sub-throttle valve provided in a bypass passage bypassing the nitrogen-enriching device and joining the intake passage at a location upstream of the main throttle valve, and the step of controlling a degree of opening of the throttle valve includes controlling a degree of opening of the main throttle valve and a degree of opening of the sub-throttle valve.

More preferably, the method further comprises a step of detecting an amount of intake air supplied to the combustion chamber, and a step of determining whether or not the detected amount of intake air has reached a predetermined upper limit intake air amount, and the step of controlling a degree of opening of the throttle valve includes holding the degree of opening of the sub-throttle valve at a predetermined appropriate degree of opening and controlling the degree of opening of the main throttle valve, when the detected amount of the intake air has not reached the predetermined upper limit intake air amount.

Further preferably, the predetermined appropriate degree of opening of the sub-throttle valve is set such that the concentration of oxygen in the intake air to be supplied to the combustion chamber becomes equal to a predetermined concentration.

Further preferably, the step of controlling a degree of opening of the throttle valve includes holding the degree of opening of the main throttle valve at a predetermined effective degree of opening and controlling the degree of opening of the sub-throttle valve, after the detected amount of intake air has reached the predetermined upper limit intake air amount.

Even more preferably, the predetermined effective degree of opening of the main throttle valve is set to such a degree of opening that even if the degree of opening of the main throttle valve is further increased from the predetermined effective degree of opening, the amount of intake air does not increase any further.

Preferably, the engine includes a supercharger provided in the intake passage at a location upstream of the nitrogen-enriching device, for supercharging the intake air.

With the arrangements of these preferred embodiments, it is possible to obtain the same advantageous effects as provided by the corresponding preferred embodiments of the first aspect of the present invention.

To attain the above object, in a third aspect of the present invention, there is provided an engine control unit including a control program for causing a computer to control an internal combustion engine including a throttle valve and a nitrogen-enriching device that enriches nitrogen in intake air, both disposed in an intake passage, and an emission reduction device disposed in an exhaust passage, for reducing exhaust emissions, wherein the control program causes the computer to detect oxygen concentration in exhaust gases, set a control amount indicative of one of a mass of oxygen supplied to a combustion chamber of the engine and a fuel injection amount, such that the detected oxygen concentration becomes equal to an oxygen concentration corresponding to stoichiometric combustion, detect operating conditions of the engine, set a target value of the control amount, which corresponds to a torque demanded of the engine, based on the detected operating conditions of the engine, and control a degree of opening of the throttle valve such that the control amount becomes equal to the set target value.

With the arrangement of the third aspect of the present invention, it is possible to obtain the same advantageous effects as provided by the first aspect of the present invention.

Preferably, the throttle valve comprises a main throttle valve provided in the intake passage at a location downstream of the nitrogen-enriching device and a sub-throttle valve provided in a bypass passage bypassing the nitrogen-enriching device and joining the intake passage at a location upstream of the main throttle valve, and when the control program causes the computer to control the degree of opening of the throttle valve, the control program causes the computer to control the degree of opening of the main throttle valve and the degree of opening of the sub-throttle valve.

More preferably, the control program causes the computer to detect an amount of intake air supplied to the combustion chamber, and determine whether or not the detected amount of intake air has reached a predetermined upper limit intake air amount, and when the control program causes the computer to control the degree of opening of the throttle valve, the control program causes the computer to hold the degree of opening of the sub-throttle valve at a predetermined appropriate degree of opening and control the degree of opening of the main throttle valve, if the detected amount of the intake air has not reached the predetermined upper limit intake air amount.

Further preferably, the predetermined appropriate degree of opening of the sub-throttle valve is set such that the concentration of oxygen in the intake air to be supplied to the combustion chamber becomes equal to a predetermined concentration.

Further preferably, when the control program causes the computer to control the degree of opening of the throttle valve, the control program causes the computer to hold the degree of opening of the main throttle valve at a predetermined effective degree of opening and control the degree of opening of the sub-throttle valve, after the detected amount of intake air has reached the predetermined upper limit intake air amount.

Even more preferably, the predetermined effective degree of opening of the main throttle valve is set to such a degree of opening that even if the degree of opening of the main throttle valve is further increased from the predetermined effective degree of opening, the amount of intake air does not increase any further.

Preferably, the engine includes a supercharger provided in the intake passage at a location upstream of the nitrogen-enriching device, for supercharging the intake air.

With the arrangements of these preferred embodiments, it is possible to obtain the same advantageous effects as provided by the corresponding preferred embodiments of the first aspect of the present invention.

The above and other objects, features, and advantages of the invention will become more apparent from the following detailed description taken in conjunction with the accompanying drawings.

BRIEF DESCRIPTION OF THE DRAWINGS

FIG. 3 is a diagram showing equations for use in the control process shown in FIG. 2;

DETAILED DESCRIPTION OF PREFERRED EMBODIMENT

Figure 1:
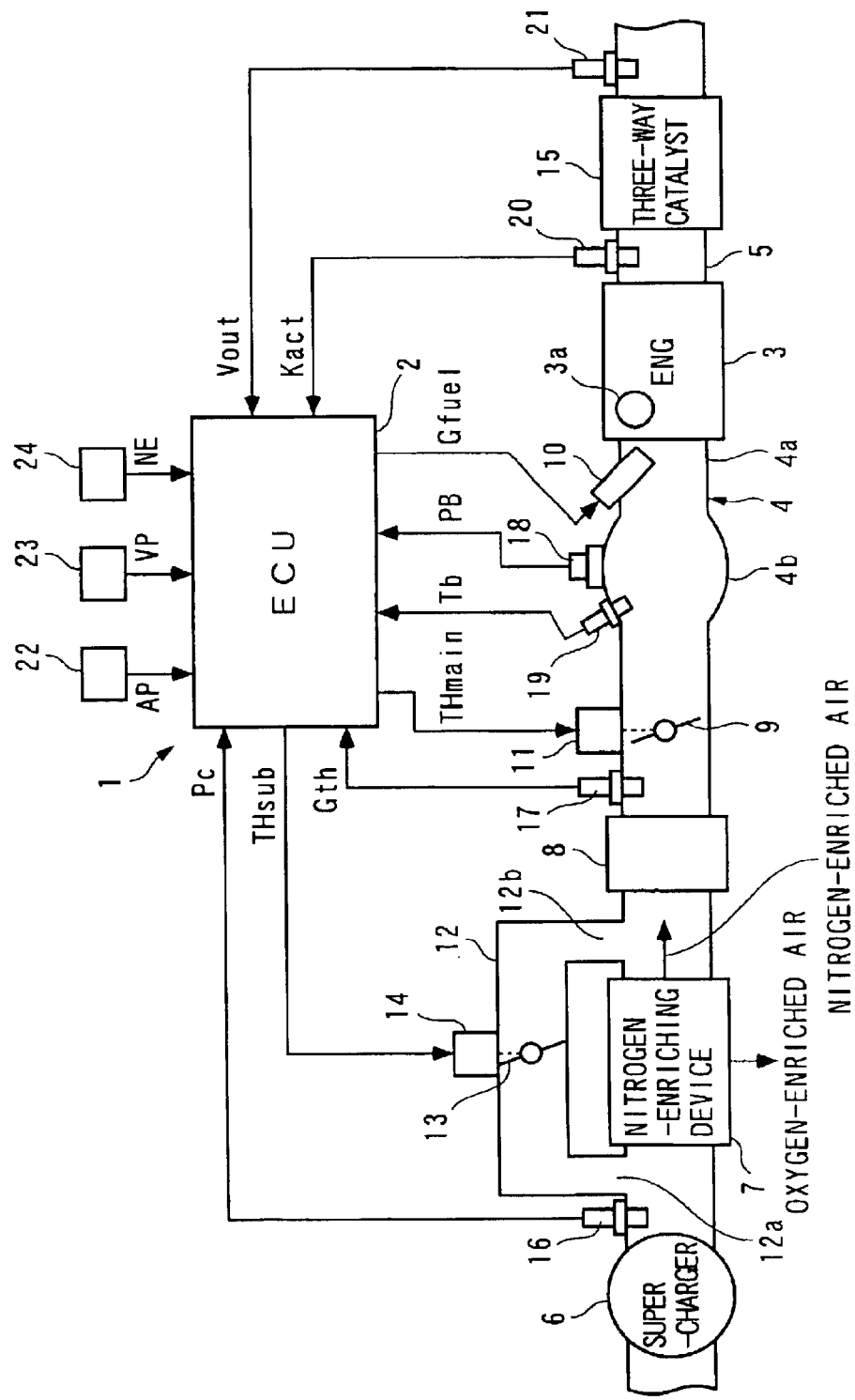
FIG. 1 is a block diagram schematically showing the arrangement of a control system according to a first embodiment of the present invention and an internal combustion engine to which the fuel injection control system is applied.

The present invention will now be described in detail with reference to the drawings. FIG. 1 schematically shows a control system according to a first embodiment of the present invention and an internal combustion engine to which the control system is applied. As shown in FIG. 1, the control system 1 includes an ECU 2 for controlling the operation of the internal combustion engine (hereinafter simply referred to as "the engine") 3.

The engine 3 is e.g. a four-cylinder gasoline engine for a vehicle, including an intake pipe 4 (intake passage) and an exhaust pipe 5 (exhaust passage) connected to respective combustion chambers 3a (only one of which is shown) of cylinders. The intake pipe 4 has a supercharger 6, a nitrogen-enriching device 7, an intercooler 8, and a main throttle valve 9, arranged therein in the mentioned order from the upstream side, with a fuel injection valve 10 disposed in a manifold 4a thereof.

The nitrogen-enriching device 7 has a fibrous separation membrane provided in a housing thereof (neither of which are shown). The nitrogen-enriching device 7 separates natural air into nitrogen-enriched air and oxygen-enriched air by making use of the difference in permeability through the separation membrane between oxygen and nitrogen contained in natural air when natural air passes therethrough. The generated nitrogen-enriched air is sent to the downstream side of the intake pipe 4, and oxygen-enriched air is discharged out of the intake pipe 4.

The supercharger 6 supercharges intake air to thereby ensure generation of differential pressure to cause the air to pass through the separation membrane of the nitrogen-enriching device 7. In the present embodiment, the supercharger 6 is implemented by a compressor of a turbocharger. The intercooler 8 cools intake air so as to prevent its density from being reduced owing to a rise in the temperature thereof.

An electric motor 11 implemented e.g. by a stepper motor is connected to the main throttle valve 9. The degree of opening of the main throttle valve 9 (hereinafter referred to as "the main throttle valve opening THmain") is controlled by a drive signal delivered from the ECU 2 to the electric motor 11, whereby the amount of intake air to be supplied to the combustion chambers 3a is controlled. A fuel injection amount Gfuel of fuel to be injected from the fuel injection valve 10 is also controlled by a drive signal from the ECU 2.

Further, in the intake pipe 4, there is provided a bypass passage 12 bypassing the nitrogen-enriching device 7. The bypass passage 12 branches from the intake pipe 4 at a branching portion 12a downstream of the supercharger 6, and joins the intake pipe 4 at a confluent portion 12b upstream of the intercooler 8. In the bypass passage 12, there is provided a sub-throttle valve 13 to which is connected an electric motor 14 implemented e.g. by a stepper motor. The degree of opening of the sub-throttle valve 13 (hereinafter referred to as "the sub-throttle valve opening THsub") is controlled by a drive signal delivered from the ECU 2 to the electric motor 14. On the other hand, in the exhaust pipe 5, there is provided a three-way catalyst 15 (emission reduction device) for reducing exhaust emissions.

With the above arrangement, the intake air (natural air) taken into the intake passage 4 is supercharged by the supercharger 6 and then sent to the nitrogen-enriching device 7, where nitrogen is enriched. On the other hand, part of the supercharged intake air flows into the bypass passage 12, and the flow rate thereof is controlled by the sub-throttle valve 13. Then, nitrogen-enriched air from the nitrogen-enriching device 14 and natural air from the bypass passage 12 join together at the confluent portion 12b and is mixed with each other, whereby intake air containing enriched nitrogen (reduced oxygen) is produced. This makes it possible to change the ratio between the amount of nitrogen-enriched air and the amount of natural air by controlling the sub-throttle valve opening THsub, to thereby control oxygen concentration in the intake air as desired. Further, when the sub-throttle valve 13 is fully open, the major portion of the intake air flows into the bypass passage 12, and hence the effect of nitrogen enrichment by the nitrogen-enriching device 7 can hardly be obtained. Therefore, the intake air is controlled to have substantially the same oxygen concentration as that of natural air.

The intake air is cooled by the intercooler 8, and the flow rate thereof is controlled by the main throttle valve 9. Then, at the manifold section 4a, the intake air is mixed with the fuel injected from the fuel injection valve 10, and supplied to the combustion chambers 3a for combustion. The three-way catalyst 15 reduces emissions of exhaust gasses generated by combustion, and then resulting exhaust gases are discharged.

Further, in the intake pipe 4, there are provided a boost pressure sensor 16 for detecting a boost pressure Pc of intake air, an air flow meter 17 (intake air amount-detecting means) for detecting an intake air flow rate Gth, an intake pressure sensor 18 (intake air amount-detecting means) for detecting an intake pressure PB, and an intake air temperature sensor 19 for detecting an intake air temperature Tb. The boost pressure sensor 16 is disposed at a location downstream of the supercharger 6. The air flow meter 17 is disposed between the intercooler 8 and the main throttle valve 9. The intake pressure sensor 18 and the intake air temperature sensor 19 are arranged in the intake-manifold chamber 4b. Signals indicative of operating conditions of the engine detected by these sensors are delivered to the ECU 2.

On the other hand, in the exhaust pipe 5, there are arranged an LAF sensor 20 and an O2 sensor 21 at respective locations upstream of the three-way catalyst 15 and downstream of the same. The LAF sensor 20 linearly detects an oxygen concentration Kact of exhaust gasses, in a wide range of air-fuel ratio from a rich region richer than the stoichiometric air-fuel ratio as measured using natural air to an extremely lean region, to deliver a signal indicative of the sensed oxygen concentration Kact to the ECU 2. Further, the O2 sensor 21 outputs to the ECU 2 a signal Vout whose voltage value is switched between high and low levels across a point at which the oxygen concentration in the exhaust gasses crosses an oxygen concentration corresponding to the stoichiometric air-fuel ratio.

The ECU 2 also receives a signal indicative of the degree of opening or stepped-on amount AP of an accelerator pedal, not shown, (hereinafter referred to as "the accelerator opening AP") from an accelerator opening sensor 22 (operating condition-detecting means), a signal indicative of a speed VP of the vehicle (hereinafter referred to as "the vehicle speed VP") from a vehicle speed sensor 23 (operating condition-detecting means), and a signal indicative of a rotational speed NE of the engine 3 (hereinafter referred to as "the engine speed NE") from an engine speed sensor 24.

In the present embodiment, the ECU 2 forms control amount-setting means, target value-setting means, throttle valve opening control means, and intake air amount-determining means. The ECU 2 is implemented by a microcomputer comprised of a CPU, a RAM, a ROM, and an I/O interface (none of which are shown). The signals from the aforementioned sensors 16 to 24 are input to the CPU after A/D conversion and waveform shaping by the I/O interface.

In response to these input signals, the CPU determines the operating conditions of the engine 3 in accordance with control programs read from the ROM, and controls the fuel injection amount Gfuel of fuel to be injected from the fuel injection valve 10, the main throttle valve opening THmain, and the sub-throttle valve opening THsub, based on the determined operating conditions, as described below.

Figure 2:
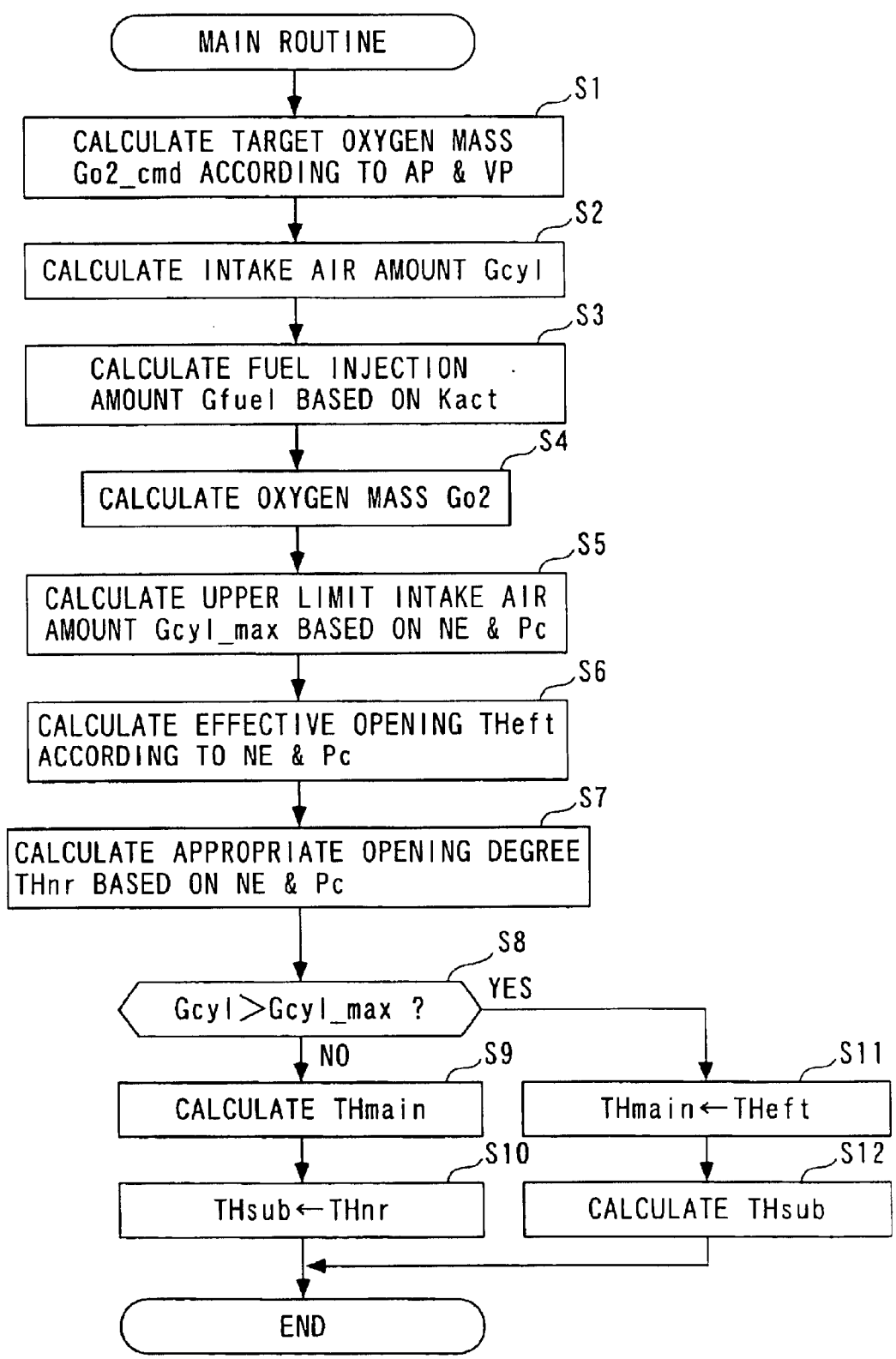
FIG. 2 is a flowchart showing a control process for controlling a main throttle valve and a sub throttle valve.
Figure 4:
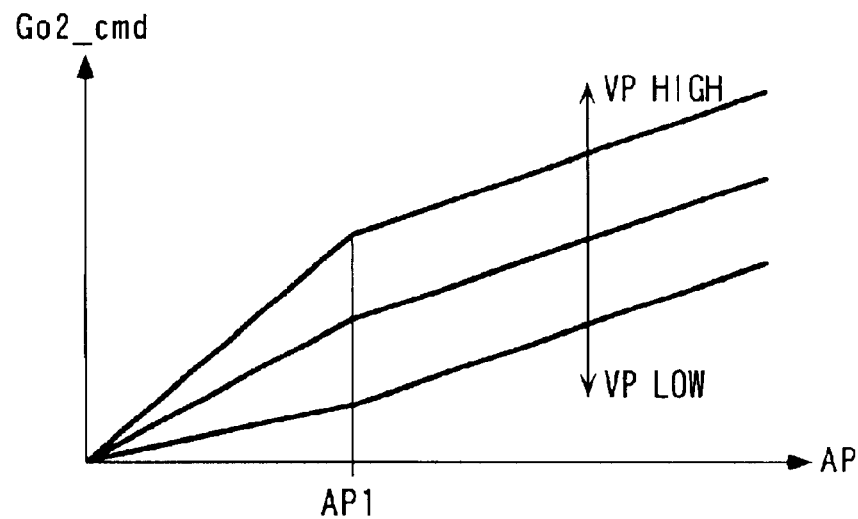
FIG. 4 is a map for use in calculating a target oxygen mass.

FIG. 2 is a flowchart showing a control process executed by the ECU 2. First, in a step 1 (shown as "S1" in FIG. 1; all steps of flowcharts referred to hereinafter are also denoted in the same manner), the target oxygen mass Go2_cmd (target value) is calculated based on the detected accelerator opening AP and vehicle speed VP. The target oxygen mass Go2_cmd corresponds to a demanded torque TRQ_RQ (see FIG. 8) demanded of the engine 3, and represents a mass of oxygen required to output the demanded torque TRQ_RQ. Therefore, the target oxygen mass Go2_cmd is indicative of a target value of an oxygen mass Go2 of oxygen to be supplied to the combustion chambers 3a. The target oxygen mass Go2_cmd is retrieved e.g. from a map shown in FIG. 4. In this map, the target oxygen mass Go2_cmd is set to a larger value as the vehicle speed VP is higher. Further, as the accelerator opening AP becomes larger, the target oxygen mass Go2_cmd increases with a large gradient in a range under a predetermined value AP1 and with a small gradient in a range equal to or larger than a predetermined value AP1.

Then, the intake air amount Gcyl of intake air being supplied to the combustion chambers 3a is calculated (step 2). This calculation is carried out based on the detected intake air flow rate Gth and intake pressure PB, using an equation (1) in FIG. 3. The second term $\Delta PB\ (k) \cdot Vb/(R \cdot Tb)$ in the right side of the equation (1) is a correction term corresponding to an amount of actual increase or decrease of intake air caused by a change in pressure in the intake-manifold chamber 4b. By correcting the intake air flow rate Gth using the equation (1), it is possible to calculate the actual intake air amount Gcyl with accuracy.

Then, the fuel injection amount Gfuel is calculated based on the oxygen concentration Kact in exhaust gasses detected by the LAF sensor 20 (step 3). This calculation of the fuel injection amount Gfuel is carried out by feedback control such that the oxygen concentration Kact becomes equal to an oxygen concentration corresponding to stoichiometric combustion. It should be noted that calculation of the fuel injection amount Gfuel may be carried out through feedback control based on the Vout signal from the O2 sensor 21. Then, an oxygen mass Go2 (control amount) required for complete combustion of the calculated fuel injection amount Gfuel of fuel is calculated by an equation (2) in FIG. 3, using a conversion coefficient Kgo2 (step 4). Thus, the fuel injection amount Gfuel and the oxygen mass Go2 are calculated as respective just enough values to achieve stoichiometric combustion.

Figure 5:
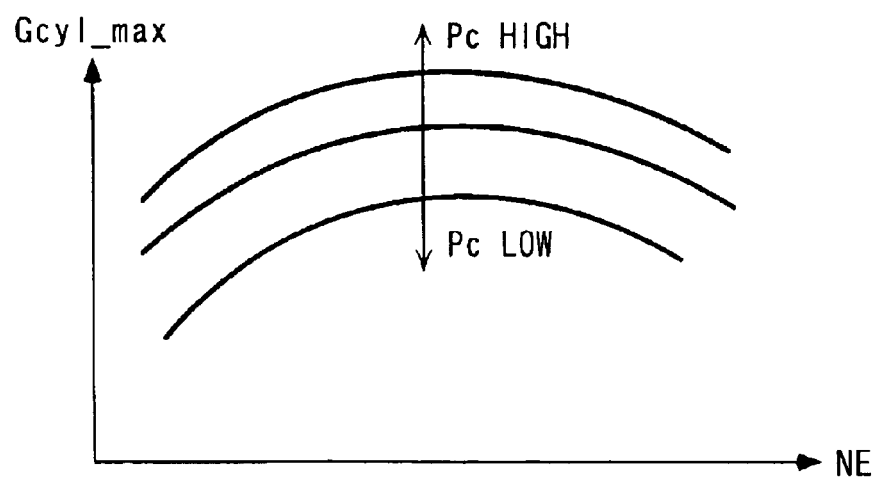
FIG. 5 is a map for use in calculating an upper limit intake air amount.

Then, an upper limit intake air amount Gcyl_max is calculated based on the detected engine speed NE and boost pressure Pc (step 5). The upper limit intake air amount Gcyl_max represents an upper limit of intake air amount at which the actual intake air amount Gcyl of intake air supplied to the combustion chambers 3a reaches an upper limit beyond which the actual intake air amount Gcyl cannot be increased even if the main throttle valve opening THmain is increased. The upper limit intake air amount Gcyl_max is retrieved e.g. from a map shown in FIG. 5. In this map, the upper limit intake air amount Gcyl_max is set to a larger value as the boost pressure Pc is higher. With respect to the engine speed NE, the upper limit intake air amount Gcyl_max becomes larger as the NE value increases up to a certain value and then decreases as the NE value further increases from the certain value. This is because when the engine speed NE becomes fairly high, intake resonance makes it difficult for intake air to enter the combustion chambers 3a.

Figure 6:
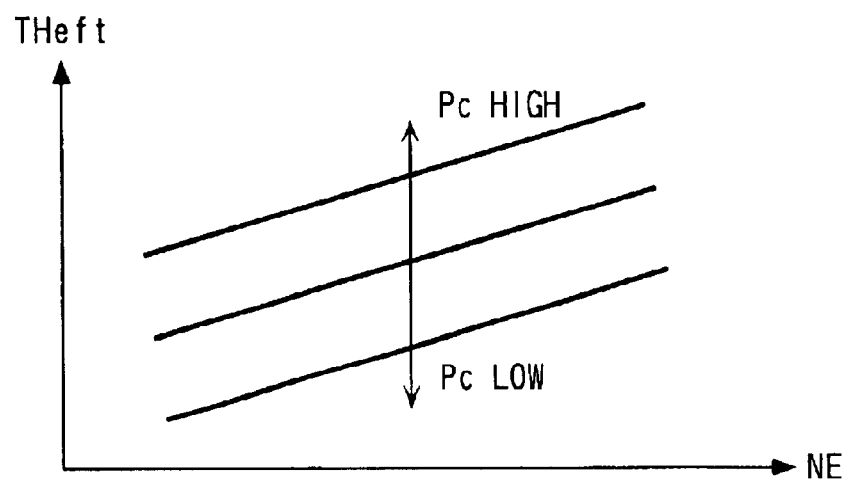
FIG. 6 is a map for use in calculating an effective opening degree of a main throttle valve.

Then, an effective opening degree THeft of the main throttle valve 9 is calculated based on the engine speed NE and the boost pressure Pc (step 6). The effective opening degree THeft represents a degree of opening of the main throttle valve 9 at which the intake air amount Gcyl reaches its limit due to rise in the pressure within the intake-manifold chamber 4b and hence the intake air amount Gcyl does not increase any further even if the main throttle valve opening THmain is increased. The effective opening degree THeft is retrieved from a map shown in FIG. 6. In this map, the effective opening degree THeft is set to a larger value as the boost pressure Pc is higher. Further, the effective opening degree THeft linearly increases with increase in the engine speed NE.

Then, an appropriate opening degree THnr of the sub-throttle valve 13 is calculated based on the engine speed NE and the boost pressure Pc (step 7). As described in detail hereinafter, during lean-burn operation, the opening of the sub-throttle valve 13 is held at the appropriate opening degree THnr so that oxygen concentration in the whole intake air as a mixture of natural air from the sub-throttle valve 13 and nitrogen-enriched air from the main throttle valve 9 can be held substantially constant. The appropriate opening degree THnr is set so as to cause the oxygen concentration in the intake air at the time to be held at the optimal concentration, described hereinbefore, or close thereto.

Figure 7:
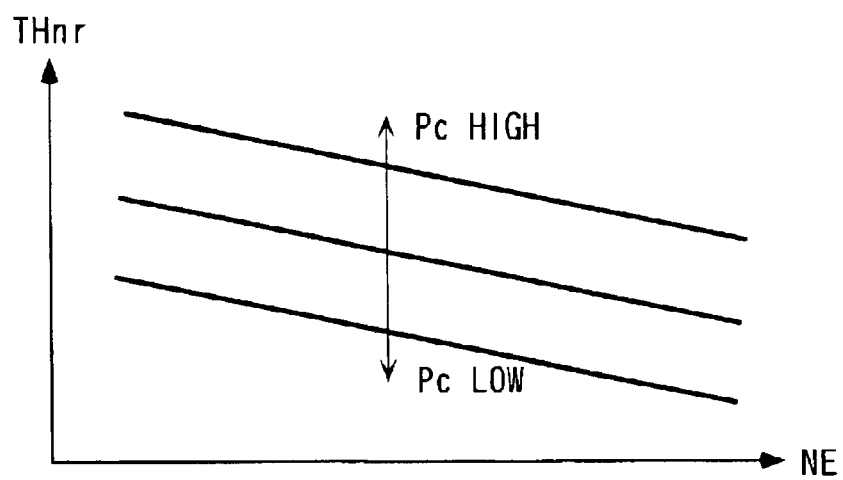
FIG. 7 is a map for use in calculating an appropriate opening degree of a sub-throttle valve.

FIG. 7 shows an example of a map for retrieving the appropriate opening degree THnr. In this map, the appropriate opening degree THnr is set to a larger value as the boost pressure Pc is higher. Further, it linearly decreases as the engine speed NE increases. This is because when the engine speed NE becomes high, the flow velocity of the intake air becomes so high that the enrichment performance of the nitrogen-enriching device 7 cannot be properly exhibited any longer, which reduces the rate of nitrogen enrichment.

Then, it is determined whether or not the intake air amount Gcyl calculated in the step 2 is larger than the upper limit intake air amount Gcyl_max calculated in the step 5 (step 8). If the answer to the question is negative (NO), i.e. if the intake air amount Gcyl has not reached the upper limit intake air amount Gcyl_max, the main throttle valve opening TH main is calculated using equations (3) and (4) in FIG. 3 (step 9). Further, the sub-throttle valve opening THsub is held at the appropriate opening degree THnr calculated in the step 7 (step 10).

As expressed by the equations (3) and (4), the calculation of the main throttle valve opening THmain is carried out by response-specifying feedback control based on the target oxygen mass Go2_cmd calculated in the step 1 and the oxygen mass Go2 calculated in the step 4. Thus, the intake air amount Gcyl is controlled by the main throttle valve opening THmain such that the oxygen mass Go2 supplied to the combustion chamber 3b converges upon the target oxygen mass Go2_cmd corresponding to the demanded torque TRQ_RQ. This makes it possible to supply the oxygen mass Go2 commensurate with the demanded torque TRQ_RQ to the combustion chambers 3a while maintaining the state of stoichiometric combustion, thereby meeting the torque demand. It should be noted that the response-specifying feedback control is employed so as to prevent misfire caused by excess concentration of nitrogen in the intake air due to overshoot.

On the other hand, if the answer to the question of the step 8 is affirmative (YES), i.e. if the intake air amount Gcyl has reached the upper limit intake air amount Gcyl_max, the main throttle valve opening THmain is held at the effective opening degree THeft calculated in the step 6 (step 11). As a result, the intake air Gcyl is maximized. Then, the sub-throttle valve opening THsub is calculated using the equations (5) and (6) in FIG. 3 (step 12). As expressed by these equations, the calculation of the sub-throttle valve opening THsub is carried out by response-specifying feedback control based on the target oxygen mass Go2_cmd and the oxygen mass Go2, similarly to the case of calculation of the main throttle valve opening THmain in the step 9.

Thus, the sub-throttle valve opening THsub is controlled such that the oxygen mass Go2 converges upon the target oxygen mass Go2_cmd. This changes the ratio between the amount of natural air and the amount of nitrogen-enriched air, whereby the amount of oxygen concentration in the intake air is increased or decreased. Therefore, also in this case, it is possible to supply the oxygen mass Go2 commensurate with the demanded torque TRQ_RQ to the combustion chambers 3a while maintaining the state of stoichiometric combustion, thereby meeting the torque demand. The response-specifying feedback control is employed so as to prevent degradation of drivability owing to overshoot of the output torque of the engine 3 caused by overshoot of the oxygen mass Go2 in an increasing direction.

Figure 8:
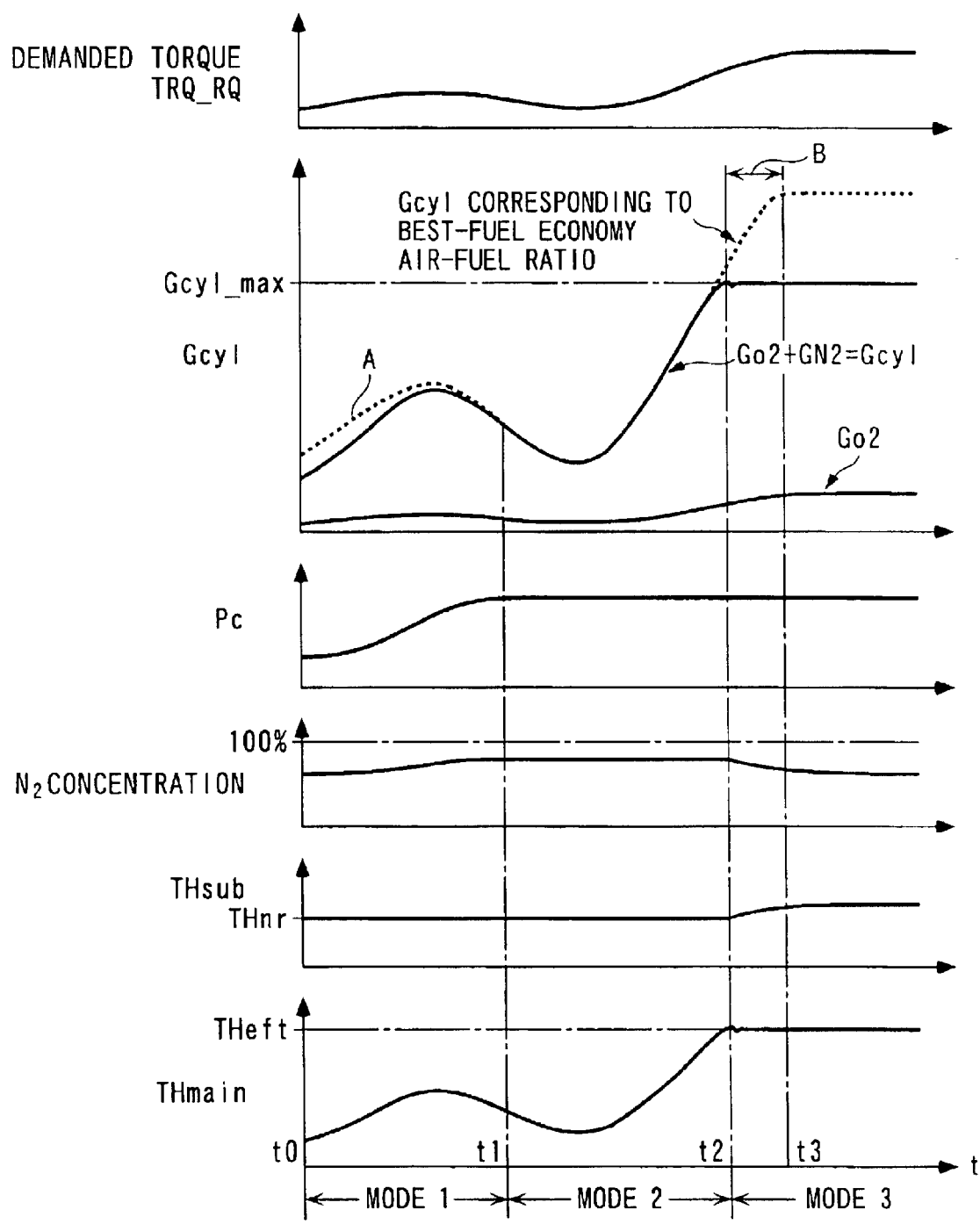
FIG. 8 is a timing chart useful in explaining an example of operation achieved by the control process in FIG. 2.
Figures 9, 10:
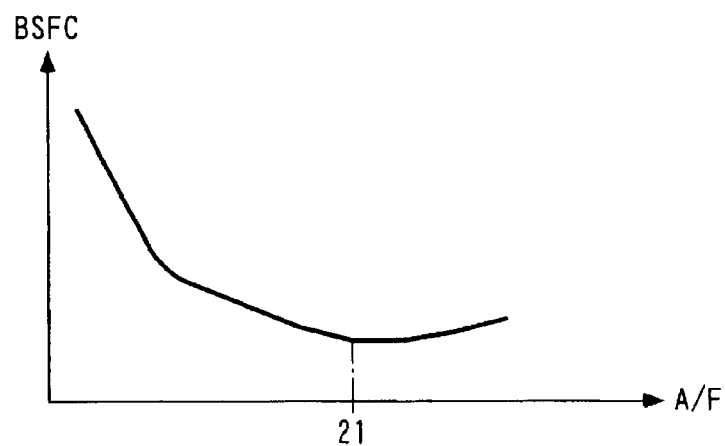
FIG. 9 is a diagram useful in explaining the relationship between the air-fuel ratio and combustion efficiency.
FIG. 10 is a diagram useful in explaining the relationship between the amount of injected fuel and the mass of oxygen used for combustion thereof.

FIG. 8 shows an example of operation of the engine 3 achieved by the control process in FIG. 2. In FIG. 8, it is assumed that the vehicle is started in an idling state at a time t0, and after the demanded torque TRQ_RQ of the engine 3 has increased as shown in FIG. 8, the boost pressure Pc of the supercharger 6 fully rises at a time t1, and then, at a time t2, the intake air amount Gcyl exceeds the upper limit intake air amount Gcyl max. In this case, the control mode of the engine 3 changes sequentially from a mode 1 through a mode 3.

Mode 1 (t0–t1)

In the mode 1, the intake air amount Gcyl is smaller than the upper limit intake air amount Gcyl_max, so that by execution of the steps 9 and 10 in FIG. 2, the sub-throttle valve opening THsub is held at the appropriate opening degree THnr and at the same time the main throttle valve opening THmain is controlled to increase or decrease the intake air amount Gcyl. As a result, the oxygen mass Go2 corresponding to the demanded torque TRQ_RQ is supplied to the combustion chamber 3a with the state of stoichiometric combustion being maintained.

Further, in the mode 1, since the boost pressure Pc generated by the supercharger 6 driven by the engine 3 is rising, the enrichment rate of the nitrogen-enriching device 7 is increasing. For this reason, the oxygen concentration in the intake air is decreasing from the concentration (21%) in natural air toward the optimum concentration (14.7%). Even in this condition, the intake air amount Gcyl is controlled in a decreasing direction through the control of the main throttle valve opening THmain depending on the high oxygen concentration in the intake air, so that the state of stoichiometric combustion is maintained and at the same time the torque demand is met. The decreased amount of the intake air amount Gcyl is represented as the difference between a dotted line A and a sold line in FIG. 8. In the mode 1, the air-fuel ratio is lower than a value for best fuel economy (best-fuel economy air-fuel ratio). Thus, in the mode 1, even in a condition where the nitrogen enrichment rate of the nitrogen-enriching device 7 is insufficient and changing as the boost pressure Pc is rising, lean-burn operation is carried out at an air-fuel ratio lower than the best-fuel economy air-fuel ratio, while maintaining the state of stoichiometric combustion and meeting the demanded torque TRQ_RQ.

Mode 2 (t1–t2)

In the mode 2, the rise in the boost pressure Pc has been completed, which makes it possible to obtain a sufficient nitrogen enrichment rate of the nitrogen-enriching device with stability. The intake air amount Gcyl has not reached the upper limit intake air amount Gcyl_max, so that the sub-throttle valve opening THsub is held at the appropriate opening degree THnr, as in the mode 1, and the main throttle valve opening THmain is controlled. This causes the intake air amount Gcyl to be increased or decreased such that the oxygen mass Go2 is commensurate with the demanded torque TRQ_RQ, with the oxygen concentration in the intake air being held substantially at the optimal concentration. Thus, in the mode 2, lean-burn operation is carried out at the best-fuel economy air-fuel ratio, while maintaining the state of stoichiometric combustion and meeting the demanded torque TRQ_RQ.

Mode 3 (t2-)

In the mode 3, the intake air amount Gcyl has exceeded the upper limit intake air amount Gcyl_max, so that by execution of the steps 11 and 12 in FIG. 2, the main throttle valve opening THmain is held at the effective opening degree THeft, and the sub-throttle valve opening THsub is controlled. This causes the oxygen concentration in the intake air to be increased or decreased such that the oxygen mass Go2 is commensurate with the demanded torque TRQ_RQ, while holding the intake air amount Gcyl at the maximum. In a time period B (t2–t3) in FIG. 8, as the demanded torque TRQ_RQ increases, the oxygen concentration in the intake air increases from the optimum concentration to the concentration in natural air, causing an increase in the oxygen mass Go2. In short, this time period B corresponds to a transition period from lean-burn operation to operation other than lean-burn operation (i.e. medium or high output operation). After the time t3, the demanded torque TRQ_RQ becomes constant, so that the oxygen concentration in the intake air is held at the same level as that in natural air. Thus, in the mode 3, medium or high output operation is carried out after transition from lean-burn operation, while maintaining the stoichiometric combustion and meeting a high demanded torque TRQ_RQ.

As described above, according to the present embodiment, the ratio between the amount of nitrogen-enriched air and the amount of natural air, in which nitrogen-enriched air and natural air are supplied to the engine 3, is controlled by the main throttle vale 9 and the sub-throttle valve 13, based on the oxygen concentration Kact in the exhaust gasses and the demanded torque TRQ_RQ. Therefore, it is possible to meet a driver's demand of torque in any operating condition of the engine 3. Further, stoichiometric combustion can be carried out not only in medium or high output operation but also in lean-burn operation, so that exhaust gases can be maintained in the stoichiometric state without superfluous oxygen. Therefore, when the three-way catalyst 15 is used as an emission reduction device, it is possible to fully exploit the emission-reducing potential thereof even in lean-burn operation, thereby achieving excellent emission control.

Further, during lean-burn operation, since the main throttle valve opening THmain is controlled with the sub-throttle valve opening THsub being held at the appropriate opening degree THnr, except when the boost pressure Pc is rising, it is possible to carry out combustion at substantially the best-fuel economy air-fuel ratio, while holding the oxygen concentration in the intake air at its optimal concentration or close thereto, to thereby achieve the most excellent combustion efficiency and the best fuel economy. Furthermore, such control is executed until the intake air amount Gcyl reaches the upper limit intake air amount Gcyl_max, so that it is possible to continue lean-burn operation performed at substantially the best-fuel economy air-fuel ratio to the limit within which the demanded torque can be met, which further improves fuel economy.

Moreover, during medium or high output operation, the intake air amount Gcyl is held at its maximum, by holding the main throttle valve opening THmain at the effective opening degree THeft, and in this state, the sub-throttle valve opening THsub is controlled, to increase and decrease the oxygen concentration in the intake air. This makes it possible to sufficiently meet even a high torque demand.

Figure 11:
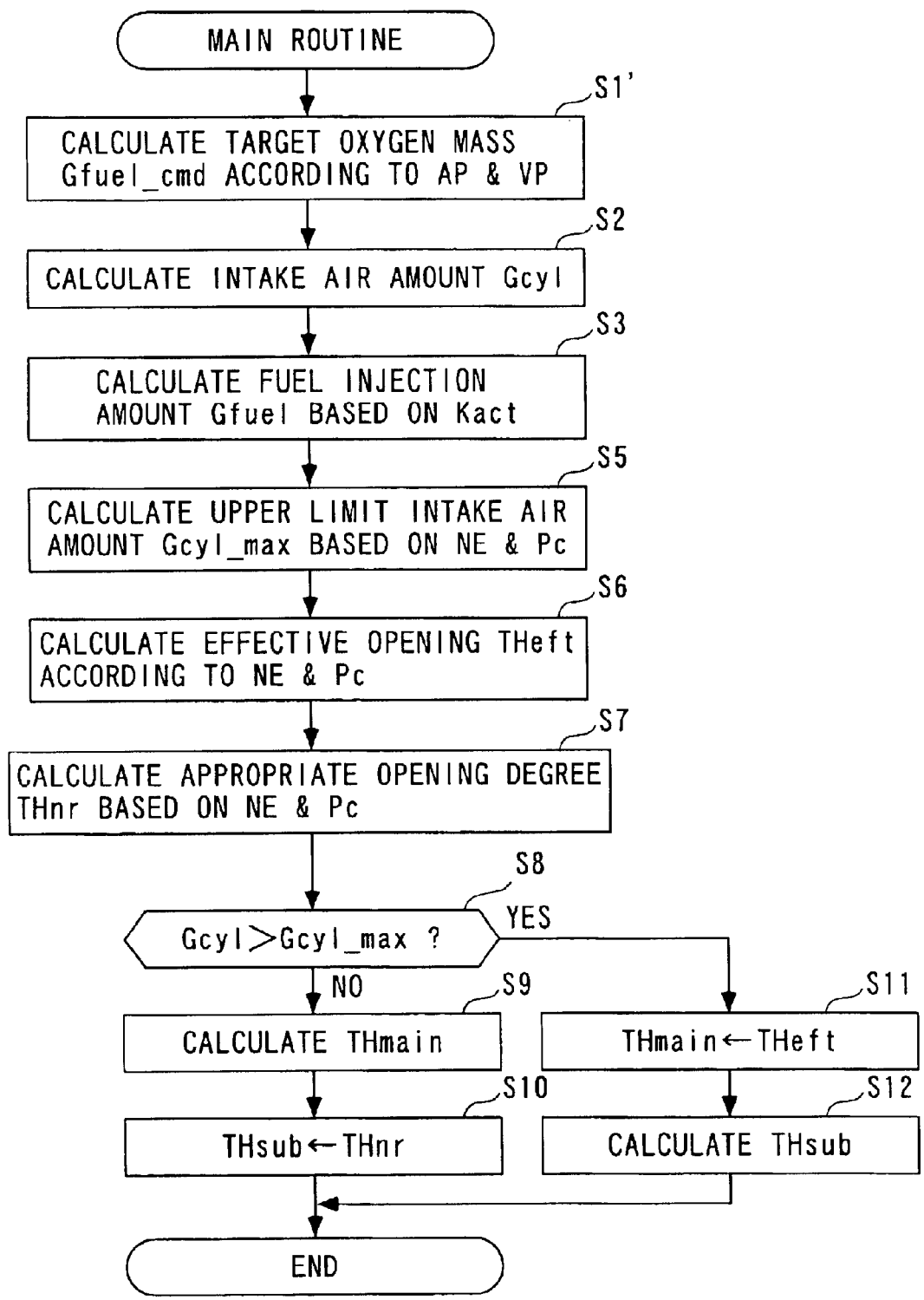
FIG. 11 is a flowchart showing a control process executed by a control system according to a second embodiment of the present invention.

FIG. 11 is a flowchart showing a control process executed by a control system according to a second embodiment of the present invention. This embodiment is distinguished from the control process executed by the control system according to the first embodiment in FIG. 2, only in that the fuel injection amount Gfuel is used as the control amount in place of the oxygen mass Go2. Therefore, the same steps as those of the control process in FIG. 2 are designated by identical step numbers, and the following description will be given of different points. In a step 1' in the present control process, the target fuel injection amount Gfuel_cmd (target value) is calculated according to the accelerator opening AP and the vehicle speed VP. The calculation of this target fuel injection amount Gfuel_cmd is carried out similarly to the calculation of the target oxygen mass Go2_cmd in the first embodiment. The calculation of the oxygen mass Go2 in the step 4 the first embodiment is omitted. Calculation of the main throttle valve opening THmain in a step 9' and calculation of the sub-throttle valve opening THsub in a step 12' are carried out by response-specifying feedback control, as in the first embodiment, based on the target fuel injection amount Gfuel_cmd calculated in the step 1' and the fuel injection amount Gfuel calculated in a step 3'. Therefore, the present embodiment can provide exactly the same advantageous effects as obtained by the first embodiment.

It should be noted that the present invention is not limited to the embodiments described above, but can be practiced in various forms. For example, since the rate of nitrogen enrichment by the nitrogen-enriching device 7 is generally higher as the temperature is higher, a heat exchanger or the like may be provided at a location upstream of the nitrogen-enriching device 7, for increasing the temperature. In this case, it is preferable to use a heat exchanger of a type that utilizes waste heat of exhaust gases from the engine 3. Further, the present invention can be applied to a ship propulsion engine, such as an outboard engine, which has a vertically-installed crankshaft.

It is further understood by those skilled in the art that the foregoing are preferred embodiments of the invention, and that various changes and modifications may be made without departing from the spirit and scope thereof.

What is claimed is:

1. A control system for an internal combustion engine including a throttle valve and a nitrogen-enriching device that enriches nitrogen in intake air, both disposed in an intake passage, and an emission reduction device disposed in an exhaust passage, for reducing exhaust emissions, the control system comprising:

an oxygen concentration sensor provided in the exhaust passage, for detecting oxygen concentration in exhaust gases;

control amount-setting means for setting a control amount indicative of one of a mass of oxygen supplied to a combustion chamber of the engine and a fuel injection amount, such that the detected oxygen concentration becomes equal to an oxygen concentration corresponding to stoichiometric combustion;

operating condition-detecting means for detecting operating conditions of the engine;

target value-setting means for setting a target value of the control amount, which corresponds to a torque demanded of the engine, based on the detected operating conditions of the engine; and throttle valve opening control means for controlling a degree of opening of the throttle valve such that the control amount becomes equal to the set target value.

2. A control system as claimed in claim 1, wherein a rate of nitrogen enrichment by the nitrogen-enriching device is set such that the oxygen concentration in the intake air to be supplied to the combustion chamber becomes equal to a predetermined oxygen concentration.

3. A control system as claimed in claim 1, wherein the throttle valve comprises a main throttle valve provided in the intake passage at a location downstream of the nitrogen-enriching device and a sub-throttle valve provided in a bypass passage bypassing the nitrogen-enriching device and joining the intake passage at a location upstream of the main throttle valve, and wherein said throttle valve opening control means controls a degree of opening of the main throttle valve and a degree of opening of the sub-throttle valve.

4. A control system as claimed in claim 3, further comprising intake air amount-detecting means for detecting an amount of intake air supplied to the combustion chamber, and intake air amount-determining means for determining whether or not the detected amount of intake air has reached a predetermined upper limit intake air amount, and wherein when the detected amount of the intake air has not reached the predetermined upper limit intake air amount, said throttle valve opening control means holds the degree of opening of the sub-throttle valve at a predetermined appropriate degree of opening and controls the degree of opening of the main throttle valve.

5. A control system as claimed in claim 4, wherein the predetermined appropriate degree of opening of the sub-throttle valve is set such that the concentration of oxygen in the intake air to be supplied to the combustion chamber becomes equal to a predetermined concentration.

6. A control system as claimed in claim 4, wherein after the detected amount of intake air has reached the upper limit intake air amount, said throttle valve opening control means holds the degree of opening of the main throttle valve at a predetermined effective degree of opening and controls the degree of opening of the sub-throttle valve.

7. A control system as claimed in claim 6, wherein the predetermined effective degree of opening of the main throttle valve is set to such a degree of opening that even if the degree of opening of the main throttle valve is further increased from the predetermined effective degree of opening, the amount of intake air does not increase any further.

8. A control system as claimed in claim 1, further comprising a supercharger provided in the intake passage at a location upstream of the nitrogen-enriching device, for supercharging the intake air.

9. A method of controlling an internal combustion engine including a throttle valve and a nitrogen-enriching device that enriches nitrogen in intake air, both disposed in an intake passage, and an emission reduction device disposed in an exhaust passage, for reducing exhaust emissions, the method comprising the steps of:

detecting oxygen concentration in exhaust gases;

setting a control amount indicative of one of a mass of oxygen supplied to a combustion chamber of the engine and a fuel injection amount, such that the detected oxygen concentration becomes equal to an oxygen concentration corresponding to stoichiometric combustion;

detecting operating conditions of the engine;

setting a target value of the control amount, which corresponds to a torque demanded of the engine, based on the detected operating conditions of the engine; and controlling a degree of opening of the throttle valve such that the control amount becomes equal to the set target value.

10. A method as claimed in claim 9, wherein a rate of nitrogen enrichment by the nitrogen-enriching device is set such that the oxygen concentration in the intake air to be supplied to the combustion chamber becomes equal to a predetermined oxygen concentration.

11. A method as claimed in claim 9, wherein the throttle valve comprises a main throttle valve provided in the intake passage at a location downstream of the nitrogen-enriching device and a sub-throttle valve provided in a bypass passage bypassing the nitrogen-enriching device and joining the intake passage at a location upstream of the main throttle valve, and wherein the step of controlling a degree of opening of the throttle valve includes controlling a degree of opening of the main throttle valve and a degree of opening of the sub-throttle valve.

12. A method as claimed in claim 11, further comprising a step of detecting an amount of intake air supplied to the combustion chamber, and a step of determining whether or not the detected amount of intake air has reached a predetermined upper limit intake air amount, and wherein the step of controlling a degree of opening of the throttle valve includes holding the degree of opening of the sub-throttle valve at a predetermined appropriate degree of opening and controlling the degree of opening of the main throttle valve, when the detected amount of the intake air has not reached the predetermined upper limit intake air amount.

13. A method as claimed in claim 12, wherein the predetermined appropriate degree of opening of the sub-throttle valve is set such that the concentration of oxygen in the intake air to be supplied to the combustion chamber becomes equal to a predetermined concentration.

14. A method as claimed in claim 12, wherein the step of controlling a degree of opening of the throttle valve includes holding the degree of opening of the main throttle valve at a predetermined effective degree of opening and controlling the degree of opening of the sub-throttle valve, after the detected amount of intake air has reached the predetermined upper limit intake air amount.

15. A method as claimed in claim 14, wherein the predetermined effective degree of opening of the main throttle valve is set to such a degree of opening that even if the degree of opening of the main throttle valve is further increased from the predetermined effective degree of opening, the amount of intake air does not increase any further.

16. A method as claimed in claim 9, wherein the engine includes a supercharger provided in the intake passage at a location upstream of the nitrogen-enriching device, for supercharging the intake air.

17. An engine control unit including a control program for causing a computer to control an internal combustion engine including a throttle valve and a nitrogen-enriching device that enriches nitrogen in intake air, both disposed in an intake passage, and an emission reduction device disposed in an exhaust passage, for reducing exhaust emissions, wherein the control program causes the computer to detect oxygen concentration in exhaust gases, set a control amount indicative of one of a mass of oxygen supplied to a combustion chamber of the engine and a fuel injection amount, such that the detected oxygen concentration becomes equal to an oxygen concentration corresponding to stoichiometric combustion, detect operating conditions of the engine, set a target value of the control amount, which corresponds to a torque demanded of the engine, based on the detected operating conditions of the engine, and control a degree of opening of the throttle valve such that the control amount becomes equal to the set target value.

18. An engine control unit as claimed in claim 17, wherein a rate of nitrogen enrichment by the nitrogen-enriching device is set such that the oxygen concentration in the intake air to be supplied to the combustion chamber becomes equal to a predetermined oxygen concentration.

19. An engine control unit as claimed in claim 17, wherein the throttle valve comprises a main throttle valve provided in the intake passage at a location downstream of the nitrogen-enriching device and a sub-throttle valve provided in a bypass passage bypassing the nitrogen-enriching device and joining the intake passage at a location upstream of the main throttle valve, and wherein when the control program causes the computer to control the degree of opening of the throttle valve, the control program causes the computer to control the degree of opening of the main throttle valve and the degree of opening of the sub-throttle valve.

20. An engine control unit as claimed in claim 19, wherein the control program causes the computer to detect an amount of intake air supplied to the combustion chamber, and determine whether or not the detected amount of intake air has reached a predetermined upper limit intake air amount, and wherein when the control program causes the computer to control the degree of opening of the throttle valve, the control program causes the computer to hold the degree of opening of the sub-throttle valve at a predetermined appropriate degree of opening and control the degree of opening of the main throttle valve, if the detected amount of the intake air has not reached the predetermined upper limit intake air amount.

21. An engine control unit as claimed in claim 20, wherein the predetermined appropriate degree of opening of the sub-throttle valve is set such that the concentration of oxygen in the intake air to be supplied to the combustion chamber becomes equal to a predetermined concentration.

22. An engine control unit as claimed in claim 20, wherein when the control program causes the computer to control the degree of opening of the throttle valve, the control program causes the computer to hold the degree of opening of the main throttle valve at a predetermined effective degree of opening and control the degree of opening of the sub-throttle valve, after the detected amount of intake air has reached the predetermined upper limit intake air amount.

23. An engine control unit as claimed in claim 22, wherein the predetermined effective degree of opening of the main throttle valve is set to such a degree of opening that even if the degree of opening of the main throttle valve is further increased from the predetermined effective degree of opening, the amount of intake air does not increase any further.

24. An engine control unit as claimed in claim 17, said engine includes a supercharger provided in the intake passage at a location upstream of the nitrogen-enriching device, for supercharging the intake air.

* * * * *